United States Patent [19]

Saksun

[11] Patent Number: 4,741,150
[45] Date of Patent: May 3, 1988

[54] REVERSIBLE TOOL HEAD AND TOOL FOR SMOOTHING GRANULAR MATERIAL

[75] Inventor: John L. Saksun, Islington, Canada

[73] Assignee: Saksun Holdings Ltd., Islington, Canada

[21] Appl. No.: 837,115

[22] Filed: Mar. 7, 1986

[30] Foreign Application Priority Data

Oct. 24, 1985 [CA] Canada .................................. 493742

[51] Int. Cl.⁴ .............................................. A01D 7/00
[52] U.S. Cl. .............................. 56/400.21; 56/400.01
[58] Field of Search ........... 56/400.01, 400.09, 400.13, 56/400.14, 400.15, 400.19, 400.21; D8/13

[56] References Cited

U.S. PATENT DOCUMENTS

| D. 249,013 | 8/1978 | Carman | D8/13 |
|---|---|---|---|
| D. 270,226 | 8/1983 | Scarsciotti | D8/13 |
| D. 273,838 | 5/1984 | Buffington | D8/7 |
| 12,396 | 2/1855 | Stillman | 56/400.21 |
| 12,750 | 4/1855 | Chatfield | 56/400.01 |
| 226,419 | 4/1880 | Quigley | 56/400.21 |
| 563,281 | 7/1896 | Kuehl | 56/400.19 |
| 1,318,765 | 10/1919 | Jones | 56/400.21 |
| 1,541,643 | 6/1925 | Hendricks | 56/400.19 |
| 1,652,260 | 12/1927 | Thompson | 56/400.21 |
| 1,678,695 | 7/1928 | Ferguson | 56/400.01 |
| 2,030,424 | 2/1936 | Bacigalupi | 56/400.21 |
| 2,110,538 | 3/1938 | Walsh | 56/400.21 |
| 3,108,426 | 10/1963 | Rugg | 56/400.01 |
| 3,206,921 | 9/1965 | Slaga | 56/400.15 |
| 3,440,810 | 4/1969 | Rhyme | 56/400.06 |
| 4,224,786 | 9/1980 | Langlie et al. | 56/400.01 |

FOREIGN PATENT DOCUMENTS

| 164369 | 4/1949 | Fed. Rep. of Germany | 56/400.04 |
|---|---|---|---|
| 2093672 | 9/1982 | United Kingdom | 56/400.01 |

Primary Examiner—John J. Wilson
Attorney, Agent, or Firm—Rogers, Bereskin & Parr

[57] ABSTRACT

A tool for smoothing a granular surface, such as golf course sand trap surfaces, has a tool head with a plurality of tines extending therefrom. A first means on one side of the head prevents material from building up ahead of the tines and a second means on the other side of the tines smooths the surface of the material through which the tines have already passed. The invention may also include a third means, for smoothing the surface of the material at the edge of the rake sweep path. These means can be provided by an elongate tubular body with dished end surfaces.

13 Claims, 2 Drawing Sheets

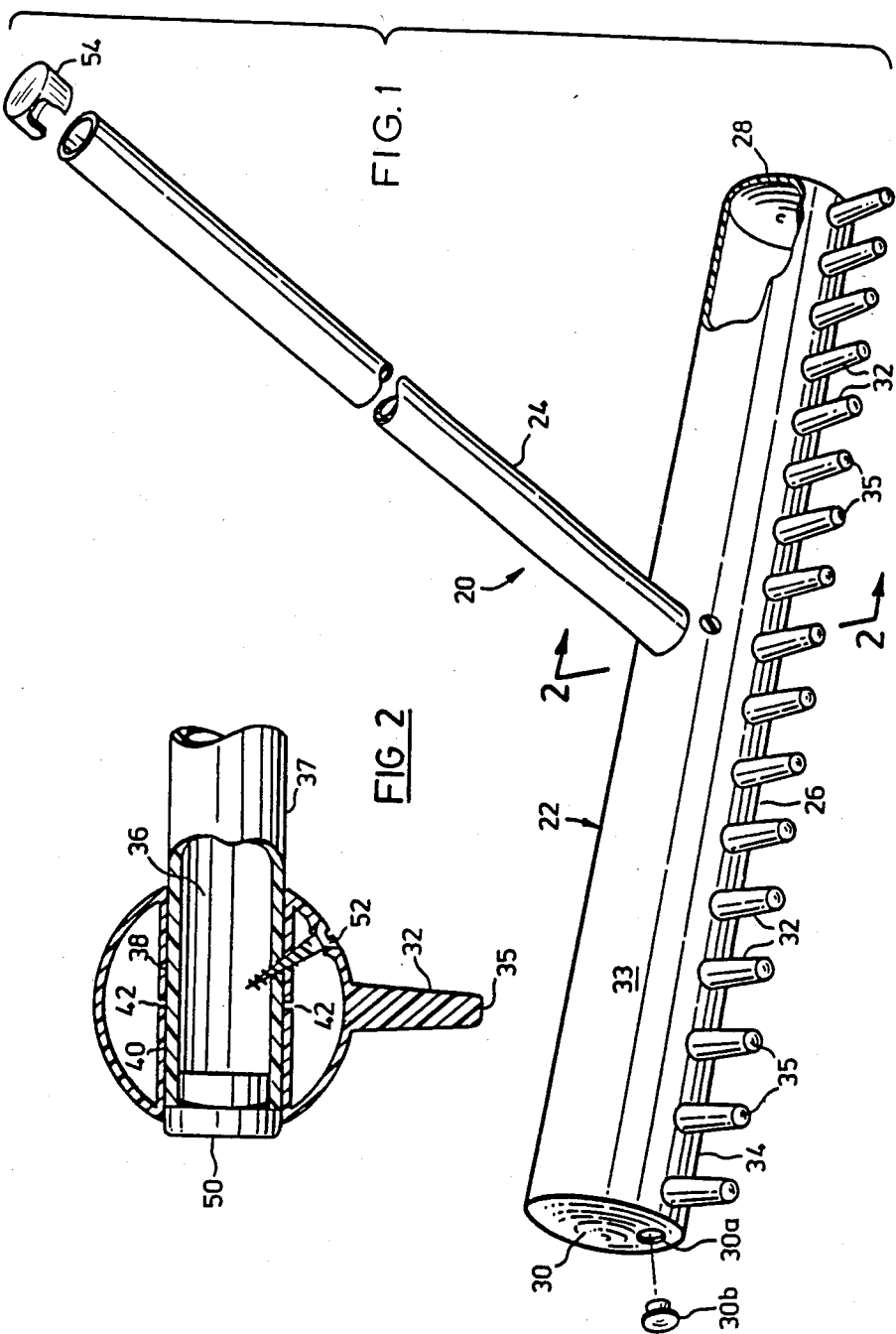

REVERSIBLE TOOL HEAD AND TOOL FOR SMOOTHING GRANULAR MATERIAL

This invention relates to a new tool for use in the smoothing of sand trap surfaces. This invention also relates to a tool head for such a tool.

On most golf courses, sand traps are a common form of obstacle. In the game of golf, a sand trap represents an obstacle from which it is difficult to play a golf ball. Sand traps are normally located at various places on a golf course such as on the fairway, and around the greens, and are strategically placed to increase the likelihood of a player playing a shot down the fairway towards or onto the green of hitting his ball into the sand trap.

Once a player has hit his ball into a sand trap, it is necessary to play the ball out of the sand trap by playing it with an appropriate club such as a sand wedge or a nine iron. To limit the difficulty of this already difficult manoeuvre, it is normal for the golf course owners to groom the surface of the sand trap to eliminate any uneven ridges or hollows. A ball nestled against a ridge of sand, or stuck in a footprint is said to have a "bad lie". Needless to say a bad lie increases the difficulty of playing the ball out of the trap in a controlled manner.

Typically, in a modern golf course, a standard garden rake is placed near the sand trap by the golf course owners. It is intended that the player who has had the misfortune of playing into the trap and thereby being forced to play out of it, shall use the rake to obliterate his tracks after he has played his shot. Stepping into the trap leaves a series of foot prints in the soft surface of the sand. Striking the ball also normally leaves an indentation in the surface of the sand. Golf etiquette requires the player disrupting the surface to groom it back to a smooth undisturbed state, so that the next player who has the misfortune of playing into the sand trap will not have an unnecessarily bad lie.

There are certain disadvantages of a common garden rake when used as a smoothing tool for sand trap surfaces. Firstly, the rake is of general application and can therefore be used for other purposes. Consequently, golf course owners typically suffer a loss of these rakes, over the course of time, as people expropriate the rakes for use in their own gardens. In addition, a standard rake is designed primarily to separate one material from another, such as leaves from grass, weeds from earth or stones from sand. A standard rake is not designed to leave the raked surface smooth and in fact does not do so. After a standard rake passes over a surface, a series of furrows are left, each furrow corresponding to one of the rake tines.

Even an extraordinarily conscientious golfer will be frustrated because with the standard rake it is impossible to make the sand surface completely smooth. For example, if the golfer wishes to turn the rake over to smooth the sand surface, to eliminate the tine furrows, sharp edges will be left at the beginning and the edges of the rake sweep path. These edge furrows can be larger and result in an even worse lie for a ball than the tine furrows. Also, most common, garden rakes do not enable sand to be smoothed in this way.

In the prior art there are several examples of devices which attempt to smooth sand trap surfaces more effectively than standard garden rakes. For example, U.S. Pat. No. 3,440,810 issued to William Rhyme discloses a rake with a head devised to overcome some of the aforementioned problems. This patent discloses a semi-spherical head portion attached to a handle. The semi-spherical head portion has tines extending radially therefrom in a direction parallel to the flat face. The handle intersects the flat face orthogonally and is located above the central longitudinal axis of the head. When in use, the flat face of the semi-spherical head forms an inclined plane. Therefore, when the rake is drawn towards the user of the rake, sand will tend to build up on the inclined face.

This build-up of sand on the front face of the rake will create several problems. Firstly, as more sand builds up, more force is exerted on the rake head by the sand which has accumulated in front of and on top of the rake head, in effect driving the head deeper into the sand. Of course, as the rake gets driven deeper into the sand, more force is exerted on the head to further drive it deeper, and so on. Rather than smoothing the surface, this device acts more like a plow, pushing sand before its blade.

Secondly, the action of this rake is more in the nature of moving sand along the surface, rather than merely smoothing the surface in place. In all cases the player will complete the smoothing of the surface of the sand trap from a position on the grass at the edge of the trap. With the invention disclosed by Rhyme, it is quite possible that at the end of the day, a large amount of sand would have been pulled to the edges of the trap, or what is worse, onto the grass of the fairway. Sand heaped upon the fairway grass looks messy and untidy, and the sand could damage the grass. Further, the movement of sand out of the trap would necessitate replenishing the sand in the trap.

Thirdly, the sand which builds up on the flat face will tend to distribute itself across the face and eventually off either side. Therefore, rather than leaving a plurality of furrows created by its tines, the device of U.S. Pat. No. 3,440,810 leaves two large ridges at either side of the rake sweep path. Clearly, these ridges are even more undesirable in the context of a golf course sand trap surface than a large number of smaller shallower furrows, because being larger, they can create more of a "bad lie" than the smaller shallower furrows can.

What is required is a sand trap rake capable of being used by a golfer to smooth the surface of the sand trap without the creation of either a row of furrows corresponding to the tines, or a series of edge ridges located at either side and the beginning of the rake sweep path. Preferably, a sand trap rake should not tend to drag sand in front of it, nor tend to dig into the sand as the invention disclosed by Rhyme does. Also, the preferred rake should provide an even balance between the need to ride over the surface to smooth the sand in place, without transporting sand to the edge of the trap, and the need for the rake to be seated against the sand to provide enough force to cause the surface of the sand trap to be smoothed.

According to the present invention, there is provided a reversible tool head for smoothing a surface of granular material, said reversible tool head comprising:

a body which is curvilinear in cross-sectional profile, and has a diameter, said body having horizontal material contacting surfaces, a plurality of tines extending from one side of the body the length of the tines being less than said diameter;

a first surface on the body, curved in profile, on one side of the tines for preventing material building up ahead of the tines, a second surface on the body curved in profile, on the other side of the tines for smoothing the surface of the material which the tines have passed through, and a third surface, curved in profile, on the opposite side of the body from the tines for final smoothing of the material upon reversing the head.

Preferrably the tool head includes fourth curved surfaces located at both ends of said cylinder for smoothing the surface of the material at each end of the reversible tool head.

The present invention also provides a tool for smoothing sand trap surfaces, which tool comprises a tool head as just defined and a handle attached to it. In a preferred embodiment, the tool has a head which is of uniform circular cross-section along its length, and includes rounded end surfaces of part spherical shape; a plurality of radially extending tines which are disposed in a single row tines also are of a length which is less than the diameter of the head in cross-section. The head also includes a handle attachment means, which consists of a cylindrical bore located centrally in the head extending orthogonally to the longitudinal plane of the tines. The handle attachment means is adapted to receive an end of a handle. One end of the handle is mounted in the handle attachment means.

The tool or rake when pulled towards the user thereof, does not tend to accumulate sand on the front face thereof by reason of its rounded front surface. In fact, this rounded front surface has the effect of causing the rake to ride up and over any anomalies in the sand surface which may be located in the path of the rake. In addition, the rounded ends tend to even out the sand surface by providing a smooth transition at the edge of the rake sweep path. Further, by turning the rake 180°, the user then has a completely rounded surface without tines with which to smooth the surface of the sand. However, it is generally more effective to use the device of this invention with the tines pointing downward, as the tines provide a seating force in addition to that which the user is able to assert by pushing down on the handle to enable the user to erase any traces from the sand trap surface more easily.

The invention will now be more fully described with reference to the accompanying illustrations, illustrating a preferred embodiment in which:

FIG. 1 is a perspective view of a tool according to the present invention;

FIG. 2 is a sectional view along lines 2—2 of FIG. 1;

Figure 4:
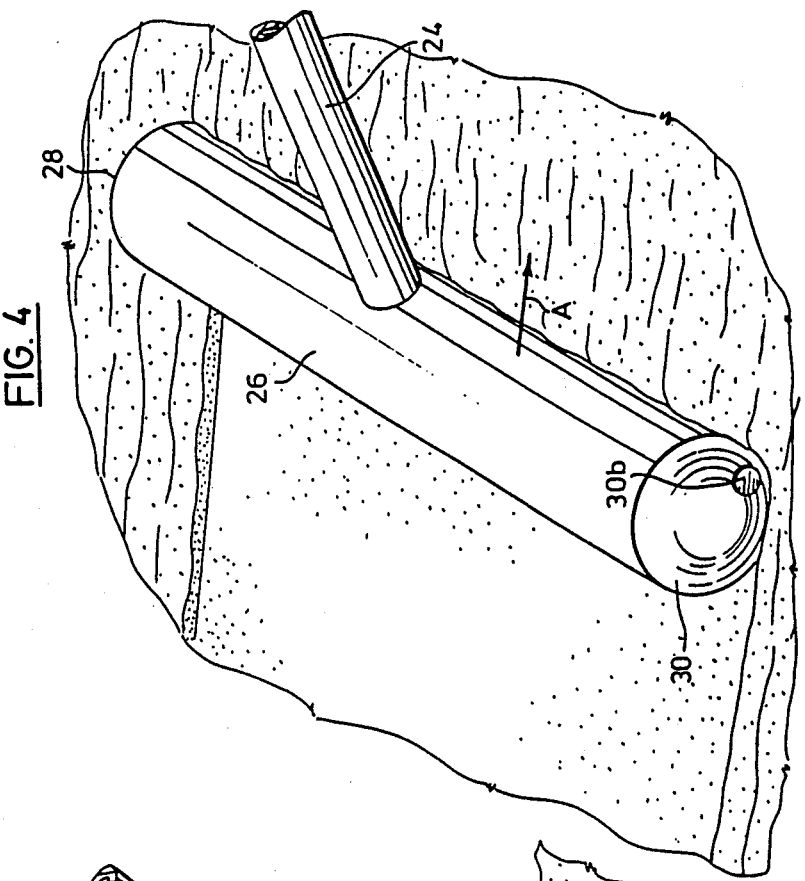
FIG. 4 is a perspective view of the head of the tool in sand.

With reference to FIG. 1, a tool or rake is generally denoted by the reference 20, and comprises a rake head 22, to which is attached an elongate handle 24. Rake head 22 comprises a tubular body portion 26, which has a circular cross-section. Body portion 26 has rounded ends 28 and 30, and a series of radially extending tines 32. Body portion 26 has surface 33 located on one side of the tines, and surface 34 located on the other side of the tines. Rake head 22 may be formed from any suitably light-weight plastic, and it has been found that injection blow molding can be used to form rake head 22.

Tines 32 are located in a single row in the preferred embodiment and gradually taper outwardly as shown in FIG. 1. Tines 32 have rounded end tips 35.

As shown in FIG. 2, rake head 22 is hollow. The body portion 26 and tines 32 have a generally uniform wall thickness. Further, a central bore 36 is cast into the center of the head, and is sized to receive handle end 37 of the handle 24. Where the rake head 22 is made by blow molding, it has been found necessary to make bore 36 in two stages. In the first stage, the molding stage, two shafts are formed, which extend from opposite sides of the body portion 26 into the center of the rake head. These shafts are noted as 38 extending inwardly from surface 33 and 40 extending inwardly from surface 34 and as can be seen in FIG. 2 are formed about the same axis. Due to the nature of the molding process it is not possible to connect shafts 38, and 40, so after forming the ends are separate by a narrow gap 42. In the second stage, when the head 22 is made ready for receiving handle end 37, the lands of excess material located at the innermost ends of shafts 38 and 40 are removed. Narrow gap 42 is left between the ends of each shaft 38 and 40, but now central bore 36 extends completely through the head.

As a further result of being formed by a blow molding process, rounded end 30 will have a circular hole 30A. To improve the appearance of rake head 22 and to prevent foreign material from entering the rake head, plug 30B is inserted into hole 30A.

The handle 24 may also be made from any suitable lightweight plastic, preferably fiberglass, and is also preferably hollow and tubular. Of course, handle 24 must be of sufficient strength and rigidity to allow the user of the rake to apply some pressure to the surface of the sand when the tool 20 is in use.

The handle 24 may also have a cap 54 located at the upper edge. The handle end 37 is sealed by plug 50. A screw 52 is used to penetrate rake head 22 and fasten handle 24 securely to rake head 22. Screw 52 further serves to prevent rotation of handle 24 relative to rake head 22.

Figure 3:
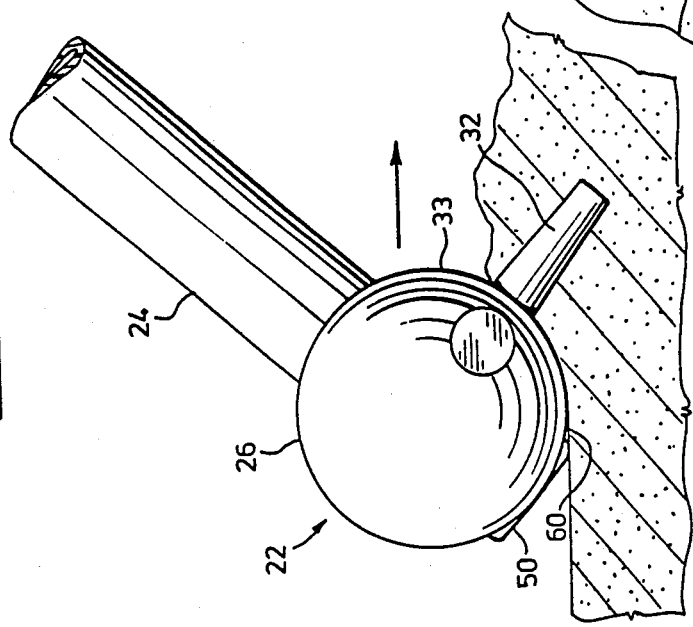
FIG. 3 is a horizontal view showing a head of the tool of FIGS. 1 and 2 in sand.

As can be seen in FIG. 3 when the rake is used, the handle 24 and also the tines 32 will form an angle with the ground. When X is between 30° and 35°, good results are acheived. When pulled, the rake 20 is moved in the direction of arrow A. As shown the rake 20 will tend to ride over surface anomalies and the sand will not be able to accumulate in front of the head 22 by reason of the rounded front face 33. In this position the trailing or back rounded face 34 will cease to make contact with the sand at point 60 of surface 34. The contact between the sand surface and the rounded rake head 22 at point 60, after the tines 32, means any furrows arising from tines 32 are effectively erased.

FIG. 4 shows a view of the rake or tool 20 being operated as in FIG. 3. As can be seen in FIG. 4, there are no furrows left behind the rake head. Although the rounded front face 33 of the rake head 22 will serve to prevent sand from building up in front of the rake it may be that a small amount of sand will be pushed along nonetheless. However, in that event, the rounded ends 28 and 30 of the rake will allow the sand to move to the side of the rake sweep path and spread out. In this fashion the large edge ridges produced by ordinary rakes, and the devices of the prior art are reduced, if not eliminated.

Also, if desired, a user can reverse the head 22, so that the tines 32 are uppermost. The head 22 then presents solely a smooth cylindrical surface to the sand. By pushing or pulling the head 22 across the sand, a fine or light smoothing of any small imperfections in the surface can be effected. Again, the rounded ends 28, 30 prevent any ridges being formed of the edges of the rake path.

I claim:

1. A reversible tool head for smoothing a surface of granular material, said reversible tool head comprising:
    a body which is curvilinear in cross-sectional profile, and has a diameter, said body having horizontal material contacting surfaces,
    a plurality of tines extending from one side of the body, the length of the tines being less than said diameter;
    a first surface on the body, curved in profile, on one side of the tines for preventing material building up ahead of the tines,
    a second surface on the body, curved in profile, on the other side of the tines for smoothing the surface of the material which the tines have passed through,
    and
    a third surface, curved in profile, on the opposite side of the body from the tines for final smoothing of the material upon reversing the head.

2. A reversible tool head as claimed in claim 1, wherein said first, second and third surfaces of said body comprise a cylinder.

3. The reversible tool head of claim 2, wherein the plurality of tines and the cylindrical body portion are integrally formed as a hollow body having a generally uniform wall thickness.

4. The reversible tool head of claim 1, 2 or 3 wherein said reversible tool head includes fourth curved surfaces located at both ends of said body for smoothing the surface of the material at each end of the reversible tool head.

5. The reversible tool head of claim 1, wherein the first surface, said second surface and said third surface comprise a cylindrical surface of the body, and wherein the body has rounded ends for smoothing the surface of the material at each end of the reversible tool head.

6. The reversible tool head of claim 1, 2 or 5, wherein the plurality of tines comprise a row located in a single plane, which tines taper outwardly.

7. The reversible tool head of claim 1, 2 or 5, including handle attachment means.

8. The reversible tool head of claim 1, 2 or 5 including a handle attachment means which comprises a cylindrical bore disposed centrally in the cylindrical body and extending at right angles to said plane of said tines, and is adapted to receive an end of a tubular handle.

9. A reversible tool head for smoothing a surface of a granular material, said reversible tool head comprising:
    a plurality of tines comprising a row located in a single plane, which tines taper outwardly,
    a first surface, curved in profile on one side of the tines for preventing material from building up ahead of the tines,
    a second surface curved in profile on the other side of the tines for smoothing the surface of the material which the tines have passed through,
    a third surface, curved in profile on the opposite side of the head from the tines for final smoothing of the material upon reversing the head,
    a fourth curved surface for smoothing the surface of the material at each end of the row of tines,
    wherein said first second, third and fourth surfaces further comprise a cylindrical body portion with rounded ends,
    said body portion including handle attachment means comprising a cylindrical bore disposed centrally in the cylindrical body portion and extending orthogonally to said plane of said tines, and adapted to receive an end of a handle, the length of said tines being less than the diameter of said cylindrical body portion.

10. The reversible tool head of claim 9 wherein said body portion is hollow and elongate and which has a uniform circular cross-section along the length of the body portion.

11. The reversible tool head of claim 10 wherein said plurality of tines extend radially out from the cylindrical body portion, and have a length shorter than the diameter of said circular cross-section of said body portion.

12. A tool comprising a reversible tool head as claimed in claims 1, 9 or 10, and a handle attached to the handle attachment means.

13. A tool for smoothing sand trap surfaces, said tool comprising:
    a reversible tubular head which is of uniform circular cross-section along the length thereof and includes rounded end surfaces of part spherical shape,
    a plurality of radially extending tines which are deposed in a single row located on one longitudinal plane, said tines tapering outwardly and having a length shorter than the diameter of said head in cross-section,
    a first surface on the head, on one side of the tines for preventing material building up ahead of the tines, a second surface on the head on the other side of the tines for smoothing the surface of the material which the tines have passed through, and a third surface on the opposite side of the head from the tines for final smoothing of the material upon reversing the head, each of the surfaces being curved in profile,
    a handle attachment means comprising a cylindrical bore disposed centrally in the head and extending orthogonally to the plane of the tines and adapted to receive an end of a handle, and
    a handle having one end mounted in said handle attachment means.

* * * * *